(12) United States Patent
Fitzgerald et al.

(10) Patent No.: US 8,110,081 B2
(45) Date of Patent: Feb. 7, 2012

(54) OXYGEN SENSOR IMPROVEMENT METHOD

(75) Inventors: Timothy P. Fitzgerald, Bloomington, MN (US); C. Peter Howard, Humboldt, TN (US)

(73) Assignee: Medical Graphics Corporation, St. Paul, MN (US)

( * ) Notice: Subject to any disclaimer, the term of this patent is extended or adjusted under 35 U.S.C. 154(b) by 362 days.

(21) Appl. No.: 12/470,937

(22) Filed: May 22, 2009

(65) Prior Publication Data
US 2010/0294661 A1 Nov. 25, 2010

(51) Int. Cl.
*G01N 27/333* (2006.01)
*G01N 27/40* (2006.01)
*G01N 27/404* (2006.01)

(52) U.S. Cl. .................... 204/431; 204/432; 204/415
(58) Field of Classification Search .......... 204/431, 204/432, 412, 415
See application file for complete search history.

(56) References Cited

U.S. PATENT DOCUMENTS

| | | | |
|---|---|---|---|
| 4,077,861 A | 3/1978 | Lauer | |
| 5,830,337 A * | 11/1998 | Xu | 204/400 |
| 6,265,750 B1 | 7/2001 | Feng et al. | |
| 6,602,401 B1 | 8/2003 | Feng | |
| 6,666,963 B1 * | 12/2003 | Peng et al. | 204/432 |
| 7,093,479 B2 | 8/2006 | Berstis et al. | |
| 2008/0274401 A1 * | 11/2008 | Broy et al. | 429/163 |

OTHER PUBLICATIONS

Teledyne Analytical Instruments, UFO-130-2 Oxygen Sensor, 2 pages.
Wikipedia, Electro-galvanic fuel cell, 2 pages.
Teledyne Electronic Technologies Analytical Instruments. OEM Evaluation Prototypes, Jun. 5, 1998, Revision. 1.1., Fast Oxygen Sensor UFO-130 8 pgs.
Teledyne Analytical Instruments, FAQ, Technical Support FAQ, 14 pgs.

* cited by examiner

*Primary Examiner* — Bruce Bell
(74) *Attorney, Agent, or Firm* — Nikolai & Mersereau, P.A.; Thomas J. Nikolai

(57) ABSTRACT

A method for improving the performance of a galvanic fuel cell type oxygen sensor comprises providing a pressure equalization port leading to the interior of an inner core housing that contains the membrane, the electrolyte and the anode and cathode electrodes and hermetically sealing the sensor housing except for its sample inlet port and its sample outlet port. By connecting the same vacuum source to both the pressure equalization port and the sample outlet port, the device's membrane is less subject to movement or rupture as gas samples are drawn in via the sample inlet port. A technique for ensuring a hermetic seal is also described.

6 Claims, 2 Drawing Sheets

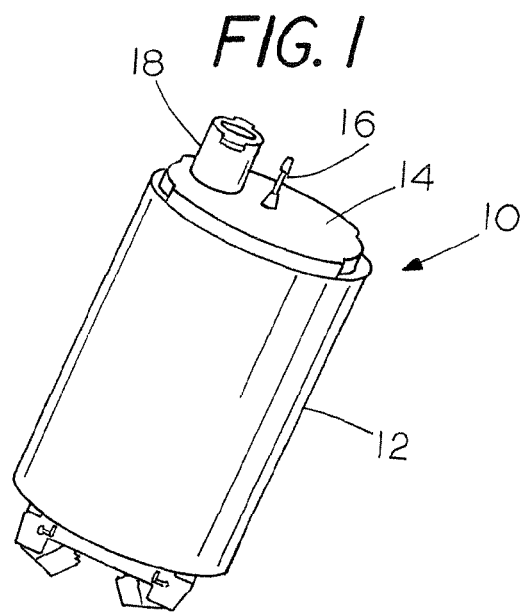
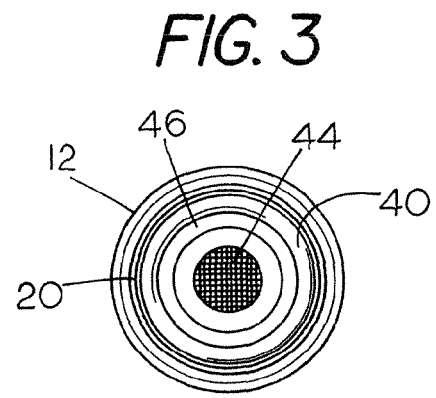
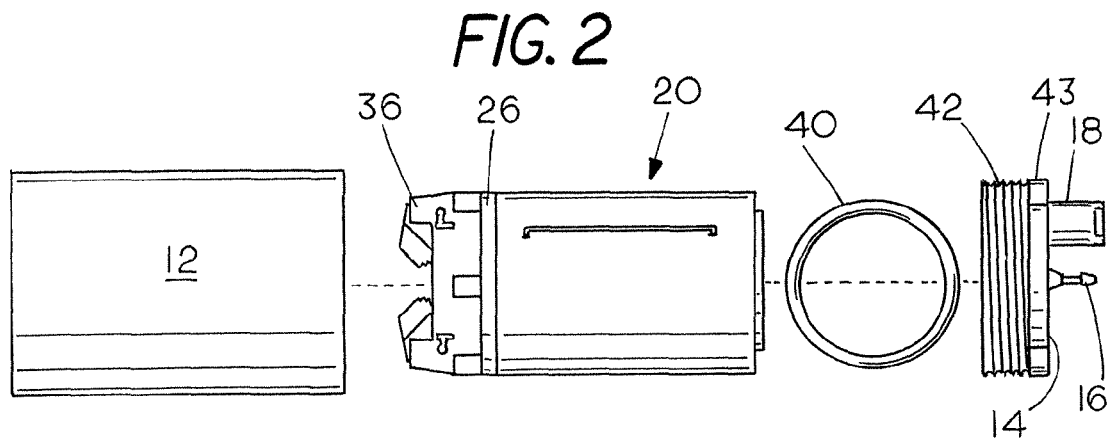
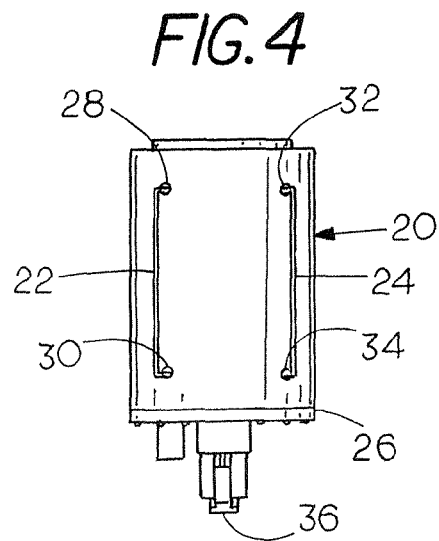
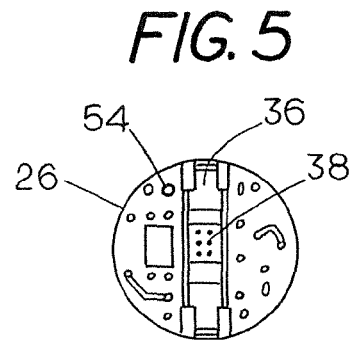

OXYGEN SENSOR IMPROVEMENT METHOD

BACKGROUND OF THE INVENTION

I. Field of the Invention

This invention relates generally to electrochemical polarographic gas analyzers and, more particularly, to a method for improving the performance characteristics of gaseous phase oxygen analyzers used to measure oxygen concentration in a sample gas stream.

II. Discussion of the Prior Art

Electrochemical gas analyzers have been available for several years which measure oxygen content of a gas or fluid by diffusing oxygen through a semipermeable membrane into an electrolyte layer proximate a cathode electrode. A polarographic voltage is applied relative to an anode spaced therefrom and the resultant depolarizing current is measured by means of an external circuit.

It is found that the accuracy and linearity of the response is heavily dependent upon the spacing between the membrane and the cathode and by the cathode response characteristics.

The electrochemical gas analyzers also depend on the semipermeable membrane covering the cathode to create stability and longevity to the cell's oxygen response. The cathode where oxygen reduction occurs has an output which is a function of active sites. The cathode material, typically either gold or silver, is configured such that the electrolyte can freely permeate its structure. In this regard, the cathode may comprise a mesh structure of gold or silver wires. An active site is defined as the point where the oxygen molecule, the electrolyte and the cathode come together.

Recent advances in Hersch cell type electrochemical gas analyzers have lead to greatly improved response in the order of 500 milliseconds for a 90% change in oxygen concentration. Further action by electronic circuitry design used with the analyzer have allowed for response augmentation to levels in the range of 100 milliseconds for 0-90% change in concentration. These fundamental advances have been largely achieved by using either very thin or porous membranes. These membranes, typically PTFE, allow for very rapid oxygen transfer, yet still achieve the fundamental basics of preventing electrolyte evaporation loss and providing an intrinsic cathode relationship.

The primary element of the galvanic sensor oxygen analyzer is an electrochemical cell consisting of two electrodes in contact with a liquid or semisolid basic electrolyte (usually potassium hydroxide). The cell electrodes are made of dissimilar metals, such as silver and gold. When a gas sample is introduced into the cell, it diffuses through a Teflon membrane. The oxygen in the sample contacts the gold cathode and is chemically reduced to hydroxyl ions. The hydroxyl ions then flow toward the silver anode, where an oxidation reaction occurs with the silver. This oxidation/reduction reaction results in a flow of electrons proportional to the oxygen concentration of the sample. The electron flow (current) is measured by an external metering circuit connected to the cell electrodes. This current is proportional to the rate of consumption of the oxygen and is indicated on a meter as a percentage or parts per million of oxygen in the sample.

The galvanic sensor oxygen analyzer is essentially a battery that produces energy when exposed to oxygen and, hence, is consumed by exposure to oxygen. It is rugged and insensitive to shock and vibration. The cell can be mounted in virtually any position without changing its sensitivity. The sensor can be packaged as a relatively small, self-contained, disposable cell. It can then be used as a fairly inexpensive means of oxygen measurement in small portable devices. The sensor measures percentage or trace levels of oxygen directly. When properly calibrated, it can provide reliable and accurate measurements. Some sensors can be refurbished rather than replaced by replacing the sensor anode.

Galvanic sensors have several major disadvantages. Because they operate on a battery principle, their life expectancy is a function of usage. Furthermore, as these sensors age, they have a tendency to read low due to a loss in sensitivity. For most process control applications, false low oxygen readings can produce dire consequences. As a result, analyzers that use battery-type sensors must be recalibrated on a frequent basis, sometimes as often as once per day, depending on the criticality of the application.

Another major drawback of battery-type sensors, particularly when used for trace oxygen measurements, is their susceptibility to "oxygen shock." If exposed to a large concentration of oxygen, these sensors can take several hours to recover. The combination of false low readings, frequent recalibrations, susceptibility to oxygen shock and relatively short life span greatly lessens the value of galvanic sensor oxygen analyzers in many critical applications.

One such commercially available oxygen sensor is the UFO-130-2 sensor available from Teledyne Analytical Instruments, Inc. located in City of Industry, Calif. Because of the porosity and relative thinness of the membrane employed in its construction, it is lacking in tensile strength, such that considerable attention must be paid to the manner in which the membrane is applied to the cathode. Any displacement in the membrane with respect to the cathode can cause the oxygen migration time to increase and an accompanying tendency for oxygen to go into solution in the potassium hydroxide electrolyte utilized in this Teledyne sensor. This affects the time response adversely and in some cases the output stability of the unit is compromised.

The design of the sample gas interface involves an inlet tube and an outlet tube arranged to provide a radial flow over the face of the membrane. Here, volumes are purposely kept extremely low and some flow is necessary to promote good washout and subsequent rapid sensor response to changing oxygen values. To achieve such flow, the gas sample is drawn through the gas sample interface by drawing a partial vacuum. Those skilled in the art will appreciate that the higher the flow, the greater the vacuum that must be applied in the sample chamber. Under these conditions, there is a tendency for the membrane to "lift off" the cathode unless it is well secured. However, there are always limits to the degree of containment, given the dead volume necessary. Under a severe vacuum, the membrane may rupture, allowing loss of electrolyte, followed by a rapid failure of the sensor itself. In less severe circumstances where no rupture occurs, the integrity of the membrane-to-cathode contact may still be threatened, giving rise to a change in response. It is found that small change in the natural response may result in major errors in systems where response is deemed to be a constant. This effect is even amplified when response augmentation electronics are being utilized.

The present invention provides a method for enhancing the performance of a galvanic fuel cell type oxygen sensor, such as the Teledyne UFO-130-2 oxygen sensor. Utilizing the method of the present invention, the pressure drop across the membrane can be reduced thereby minimizing adverse membrane effects without an attendant adverse impact on sensor response. A key feature of the improvement is the application of an equal or similar vacuum to the outside of the pliable electrolyte sac. In addition to protecting the membrane from rupture, the effect of normal atmospheric pressure changes is also negated.

SUMMARY OF THE INVENTION

The present invention provides an improved galvanic fuel cell oxygen sensor of the type comprising an inner core housing containing an electrolyte, a cathode electrode and an anode electrode within an oxygen permeable membrane sac. The inner core housing is contained within an outer housing and includes a removable cap at one end of the outer housing, the cap being provided with a sample inlet port and a sample outlet port arranged such that a gas drawn in through the sample inlet port is exposed to the cathode electrode through the porous membrane sac before exiting the sample outlet port. Further means are provided for maintaining substantially equal pressures on opposite sides of the membrane, thereby reducing displacement of the membrane relative to the device cathode electrode.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

FIG. 1 is a perspective view of a commercially available galvanic fuel cell oxygen sensor prior to modification in accordance with the method of the present invention;

FIG. 2 is an exploded side elevation view of the device of FIG. 1;

FIG. 3 is a top view of the device of FIG. 1 with the cap removed;

FIG. 4 is a side elevation of the inner core housing of the device of FIG. 1;

FIG. 5 is a bottom view of the inner core housing of the device of FIG. 1;

DESCRIPTION OF THE PREFERRED EMBODIMENT

Figure 6:
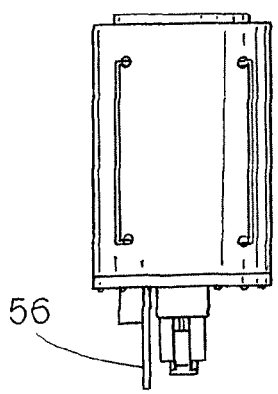
FIG. 6 is a view like that of FIG. 4 following addition of a pressure equalization port tube thereto.

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein.

The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

FIG. 1 illustrates a model UFO-130-2 ultra-fast oxygen sensor commercially available from Teledyne Analytical Instruments in its unmodified state prior to modification in accordance with the present invention. While this particular sensor is used in the following description, the method steps described can be applied to fuel cell oxygen sensors of other manufacturers as well. The oxygen sensor is indicated generally by numeral 10 and it comprises an outer, molded plastic cylindrical housing 12 having open top and bottom ends, the top end being closed by a removable, screw-on cap member 14. The cap member has a gas sample input nipple 16 projecting outwardly from the top surface thereof, the nipple being in fluid communication with a chamber (not shown) formed on the underside of the cap. Also in fluid communication with the aforementioned chamber is a gas sample outlet port 18 that comprises a Luer lock, facilitating the attachment of flexible plastic tubing thereto.

Referring next to FIG. 2, there is shown an exploded view of the oxygen sensor 10 and here it is seen that there is contained within the outer housing member 12 an inner core housing 20. Contained within this housing is a suitable electrolyte, preferably KOH, as well as an anode electrode and a cathode electrode. The anode electrode, cathode electrode and electrolyte are contained within an oxygen pervious and rather fragile polymer sac that is permeable to oxygen.

Visible in FIG. 4 are conductors 22 and 24 used to connect the anode electrode and the cathode electrode to a printed circuit board 26 that covers the otherwise open lower end of the inner core housing 20. The wire 22 exits the housing 20 via an aperture 28 and reenters the housing through an aperture 30 before connecting to the printed circuit board 26. Likewise, the cathode electrode wire 24 exits the inner core housing via an aperture 32 and reenters through aperture 34 before connecting to the printed circuit board 26.

As seen in FIG. 5, the printed circuit board has contacts 38 for applying power to the sensor 10 and for receiving output signals proportional to oxygen concentration of a sampled gas drawn in through the nipple 16 and out through the Luer fitting 18 on the cap 14. Also mounted on the printed circuit board 26 is a latch assembly 36 used to lock an electrical cable connector (not shown) to the output pin contacts 38.

With reference again to FIG. 2, to create a seal about the chamber, there is provided an O-ring 40 which is intended to block fluids from leaking into the area of the inner core 20 where the cathode is exposed to the sample gas through the membrane layer. As further seen in FIG. 2, the cap 14 has a threaded base 42 designed to mate with internal threads (not shown) formed in the outer housing 12.

FIG. 3 is a top view of the assembly of FIG. 1 but with the cap 14 removed and showing a target site 44 comprising an opening in the top surface 46 of the inner core housing 20. A metal mesh screen covers this opening and a surface of the sac that surrounds the electrolyte, the cathode and anode is visible through the mesh screen. When the cap 14 is in place on the inner core housing 20, the gas distribution chamber formed on the undersurface of the cap directly overlays the target site 44 and the O-ring 40 blocks ingress of ambient air into this zone.

FIG. 5 is a bottom view of the inner core housing showing the printed circuit board 26 in greater detail, as well as the solder terminals for the wires 22 and 24 and for circuit components mounted on the opposed side of the printed circuit board 26.

Having described the constructional feature of the commercially available oxygen sensor with the aid of FIGS. 1-5, consideration will next be given to the modifications being made to the sensor in accordance with our invention, the effect of which is to extend the life, improve the response time and preserve the accuracy over the life of the unit.

The steps of the method employed in carrying out the above improvements are as follows:

1. The threaded cap 14 is unscrewed from the outer housing 12.

Figure 7:
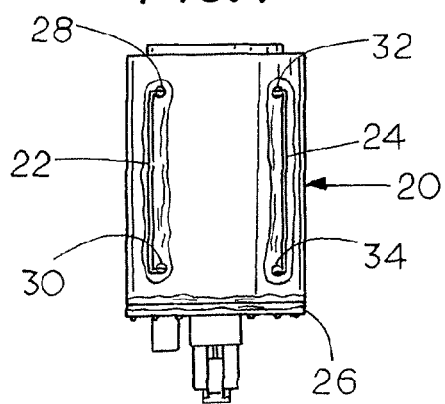
FIG. 7 is a side elevation of the inner core housing following sealing of the anode and cathode wires and the sealing of the joint surface of the inner core housing and the attached circuit board.

2. The inner core housing 20 is pushed out from the outer housing 12 and, with reference to FIG. 7, the anode and cathode lead wires 22 and 24 are coated with a lacquer that adheres these two wires to the exterior wall of the inner core housing 20. Special attention is paid to ensure that the apertures 28 through 34 are filled with the lacquer to seal those openings. Furthermore, the lacquer sealant is applied to the joint where the printed circuit board 26 abuts the lower end of the housing 20.

Figure 8:
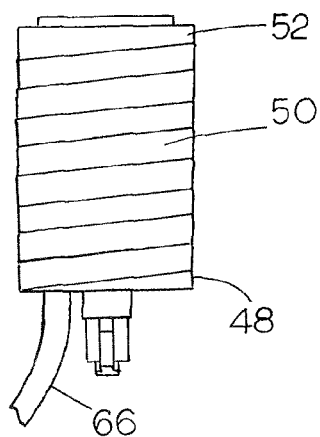
FIG. 8 is a side elevation view of the inner core housing following application of plastic electrical tape as a wrap thereto.

3. With reference to FIG. 8, a single turn of plastic electrical tape identified by numeral 48 is wrapped around the lower end of the inner core housing 20, such that the tape overhangs the bottom edge of the printed circuit board 26 by approximately 1/16 inch. Then, the electrical tape is spiral-wrapped on the cylindrical wall of the inner core housing as at 50. Again, at the upper end of the inner core housing, a single level wrap of electrical tape 52 is applied. The band of electrical tape 48 is folded in to adhere to the exposed face of the circuit board 26.

4. Referring back to FIG. 5, in the 02 sensor as manufactured and sold by Teledyne, there is a small opening 54 formed through the printed circuit board 26 to expose the interior of the inner core housing to atmospheric pressure. In accordance with the present invention, this hole 54 is enlarged to accommodate insertion of a stainless steel stub member serving as a pressure equalization port tube 56 (FIG. 6). Without limitation, the pressure equalization port tube may have a 3/16 inch O.D. and a 1/16 inch I.D.

5. Next, an approximately 3-inch long piece of 1/16 inch I.D. Tygon tubing 66 (FIG. 8) is forced over the metal pressure equalization port tube 56 so that the end of the Tygon tube contacts the printed circuit board 26. Again, the lacquer sealant is applied to the end of the Tygon tube that contacts the printed circuit board. Also, lacquer is applied to the surface of the printed circuit board and onto the edge of the electrical tape that has been folded on to the printed circuit board to enhance sealing. Tygon tubing is especially suited in that it is non-toxic, non-hemolytic and non-pyrogenic and is therefore widely used in the medical industry and has received FDA approval.

6. Once the applied lacquer has dried, the inner core housing is inserted back into the outer housing 12. The spiral taping step (Step 4, supra) effectively increases the O.D. of the inner core housing 20 such that the dead space between the inner core housing and the outer housing is significantly reduced.

7. To ensure an airtight seal between the cap and the outer housing, a Teflon thread sealing tape is wrapped about the perimeter of the threaded cap with this thread sealing tape overlapping the top edge of the cap. Sealing lacquer is again applied to the overlapped portion to adhere it to the top edge of the cap.

8. A suitably sized O-ring (not shown) is now slipped over the Teflon tape wrapped threads and is seated against the flange 43 (FIG. 2) of the cap. The cap is then screwed onto the outer housing.

Figure 9:
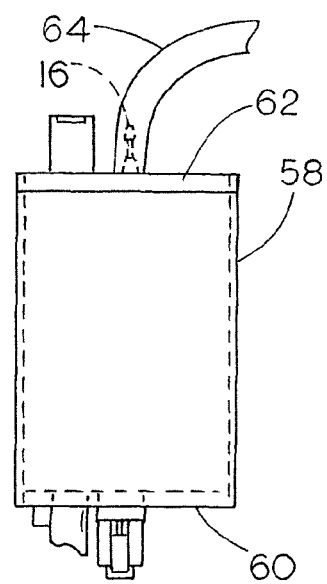
FIG. 9 is a side view of the assembled sensor following the potting of the upper and lower ends of the outer housing.

9. A precut length of shrink tubing is next slipped over the outer housing as shown in FIG. 9 where reference numeral 58 identifies the shrink tubing. The length of the shrink tubing is such that a 1/8 inch overhang is provided at the opposed ends of the outer housing. A power and sensor output cable (not shown) having a female connector for mating with the pins 38 (FIG. 5) is plugged onto the PC board 26. The shrink tubing is then heated so that it is made to shrink and closely conforms to the outer housing.

10. After the shrink tubing has cooled, the space on the bottom of the assembly defined by the overhanging shrink wrap is filled with a suitable potting compound sealant with RTV11 sealant being preferred. The sealant encapsulates the PC board and the female connector. This material cures to a rubber-like consistency and precludes entrance of air into the interior of the outer housing. The cured potting compound applied to the lower end of the assembly is identified by numeral 60 in FIG. 9.

11. Once the layer 60 of potting compound has cured, the assembly is inverted and a piece of Tygon tubing of a 1/16 inch I.D. and approximately 4 inches long is slipped over the sample inlet nipple 16 on the sensor cap 14 and again, RTV11 potting compound/sealant is used to cover the cap 14 to a height that encompasses the lower end of the Tygon tubing 64 on the sample inlet nipple. The layer of potting compound covering the cap is identified by numeral 62 in FIG. 9.

Figure 10:
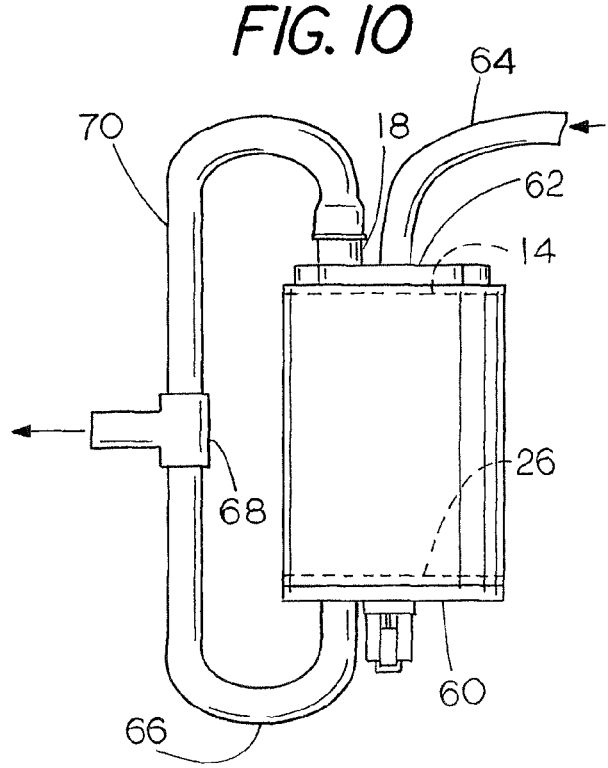
FIG. 10 shows the modified fuel cell oxygen sensor of the present invention with external tubing for coupling the device to a vacuum source.

In use, the sample inlet tube 64 shown in FIG. 10 is adapted to be connected, into a gas source such as a breathing tube in a streamlined fashion and the tube 66 that is connected to the pressure equalization port 56, is connected to one branch of a Tee connector 68. A second branch of the Tee 68 is connected by tubing 70 to the sample outlet port 18 via its Luer fitting. The third branch of the Tee 68 is adapted for connection to a vacuum source (not shown) used to draw the sample into the sensor via tube 64. The pressure in the sample chamber is equalized with the pressure within the inner core housing 20 by virtue of the described Tee connection and both sides of the membrane sac are, therefore, at the same pressure. Thus, the membrane is not stressed and there is no tendency for the membrane to lift off of the cathode nor can there be any tendency for the membrane to rupture.

It is to be realized that only a preferred embodiment of the invention has been described as applied to a Teledyne UFO-130-2 oxygen sensor and that numerous substitutions, alterations and modifications may be made without departing from the spirit and scope of the invention as defined by the following claims.

What is claimed is:

1. A galvanic fuel cell oxygen sensor comprising:
   (a) an inner core housing containing an electrolyte, a cathode electrode, an anode electrode enclosed in a porous membrane permeable to oxygen;
   (b) an outer housing for containing the inner core housing and having a cap at one end of the outer housing, where the cap has a sample inlet port and a sample outlet port arranged such that a gas drawn in through the sample inlet port is exposed to the cathode electrode and the porous membrane before exiting the sample outlet port; and
   (c) said inner core housing being hermetically sealed within the outer housing except for the presence of said sample inlet port and same outlet port in the cap and a pressure equalization port extending into the inner core housing and out through a sealed opening in the outer housing;
   (d) a printed circuit board located at an end of the inner core housing opposite from said one end, said printed circuit board having conductive connections to the cathode electrode and the anode electrode and with the pressure equalization port extending through an aperture in the printed circuit board;
   (e) a gas impervious potting compound covering a predetermined surface of the printed circuit board and filling a void between the printed circuit board and the outer housing without occluding the equalization port; and
   (f) means for maintaining substantially equal pressures on opposite sides of said membrane.

2. The galvanic fuel cell oxygen sensor of claim 1 wherein the means for maintaining substantially equal pressures comprises means adapted to couple the sample outlet port and the pressure equalization port to a common source of negative pressure.

3. The galvanic fuel cell as in claim 1 wherein the potting compound is resilient when cured.

4. The galvanic fuel cell oxygen sensor of claim 1 and further including an O-ring seal operatively disposed between the cap and the outer housing.

5. The galvanic fuel cell oxygen sensor of claim 1 wherein the cap is threaded to mate with matching threads formed at the one end of the outer housing and a fluid sealing material is disposed between the threads of the cap and the threads of the outer housing.

6. A method for improving performance of a galvanic fuel cell oxygen sensor of the type having an electrolyte, an anode electrode immersed in the electrolyte and a cathode electrode separated from the electrolyte by a thin, porous membrane capable of passing oxygen therethrough while limiting electrolyte evaporation loss, said electrolyte, anode electrode, cathode electrode and membrane being disposed in an inner tubular core housing having an upper end and a lower end, the lower end being closed by a printed circuit board to which the anode electrode and cathode electrode are connected and the upper end being overlaid by the membrane and cathode electrode, the inner tubular cylindrical core housing being contained within an outer tubular cylindrical housing having an open bottom and an open top, said open top being covered by a removable cap secured by threads to the outer tubular cylindrical housing, the cap including a gas sample inlet port and a gas sample outlet port formed therethrough leading to a chamber to which the cathode electrode and membrane are exposed, comprising the steps of:
   (a) inserting a tubular stub member through a hole formed through a thickness dimension of the printed circuit board leading to an interior of the inner tubular cylindrical core housing;
   (b) sealing the open bottom of the outer tubular housing and the printed circuit board to prevent ingress of air into the outer tubular housing;
   (c) connecting a first end of a first length of tubing to said tubular stub member extending through the printed circuit board;
   (d) connecting a first end of a second length of tubing to the sample outlet port; and
   (e) connecting the second ends of the first and second lengths of tubing to first and second branches of a tubular Tee member, respectively, whereby connection of a vacuum source to a third branch of the Tee member results in equal negative pressures being applied on opposite sides of the membrane.

\* \* \* \* \*